Figure 1:
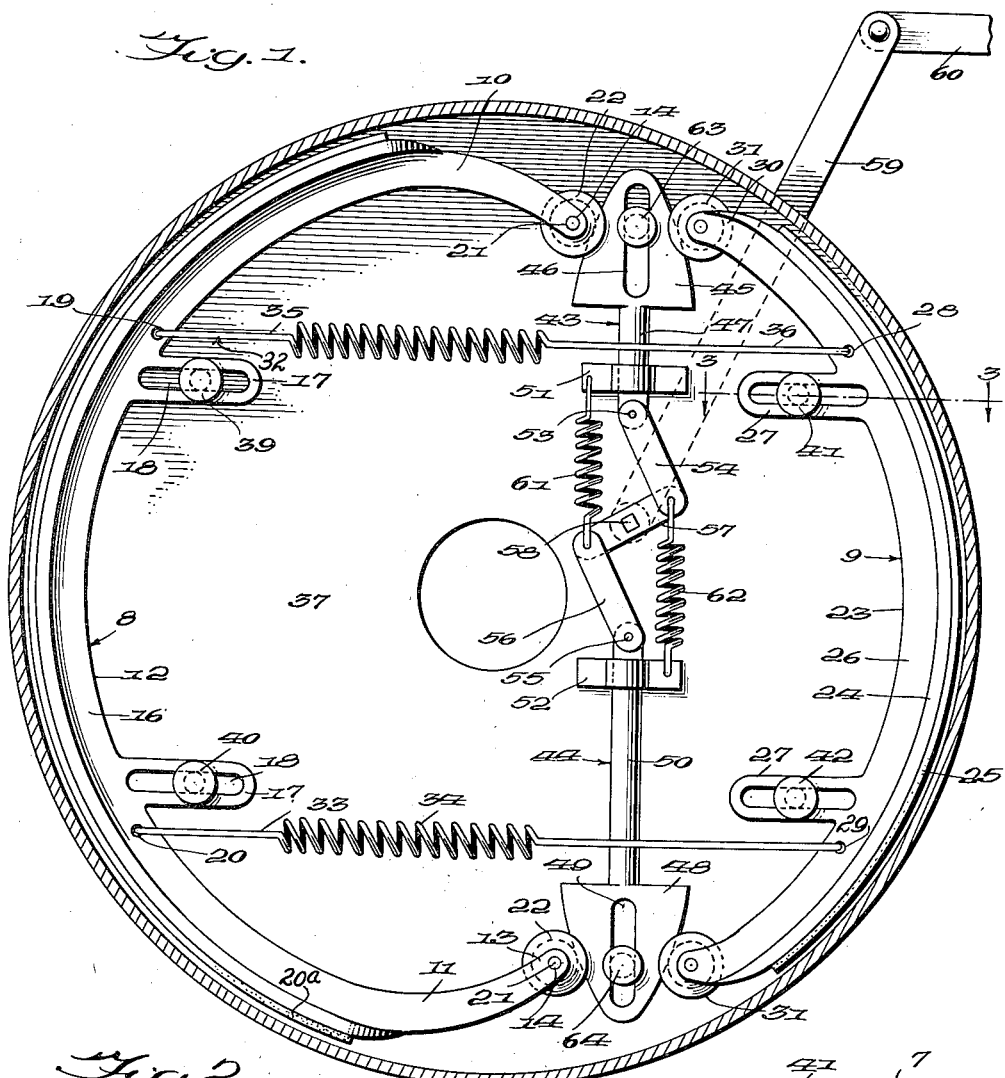

March 2, 1937.  R. G. JONES ET AL  2,072,755
BRAKE MECHANISM
Filed Aug. 14, 1936  2 Sheets-Sheet 1

Inventor
Robert G. Jones,
Romie E. Johns,

By Kimmel & Crowell
Attorney

March 2, 1937.  R. G. JONES ET AL  2,072,755
BRAKE MECHANISM
Filed Aug. 14, 1936  2 Sheets-Sheet 2

Inventor
Robert G. Jones,
Romie E. Johns,
By Kimmel & Crowell Attorney

Patented Mar. 2, 1937

2,072,755

UNITED STATES PATENT OFFICE 2,072,755

BRAKE MECHANISM

Robert G. Jones and Romie E. Johns, Jacksonville, Fla.

Application August 14, 1936, Serial No. 96,106

5 Claims. (Cl. 188—78)

This invention relates to a brake mechanism designed primarily for use in connection with the wheels of automotive vehicles, but it is to be understood that a brake mechanism, in accordance with this invention is to be employed for any purpose or in any connection for which it may be found applicable.

The invention aims to provide, in a manner as hereinafter set forth, a brake mechanism which is simple in its construction and arrangement, strong, durable, compact, including a pair of oppositely disposed slidable spring controlled brake shoes, one of greater length than the other, to obtain a smooth braking action, thoroughly efficient in its use, capable of being conveniently operated mechanically or by hydraulic pressure, readily assembled and comparatively inexpensive to manufacture.

With the foregoing and other objects in view, the invention consists of the novel construction, combination and arrangement of parts as will be more specifically described and are as illustrated in the accompanying drawings wherein is shown embodiments of the invention, but it is to be understood that changes, variations and modifications may be resorted to which fall within the scope of the invention as claimed.

Figure 2:
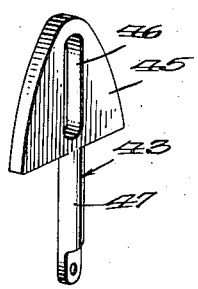
Figure 3:
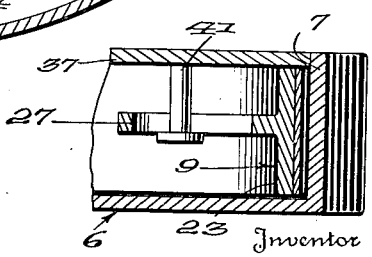
Figure 4:
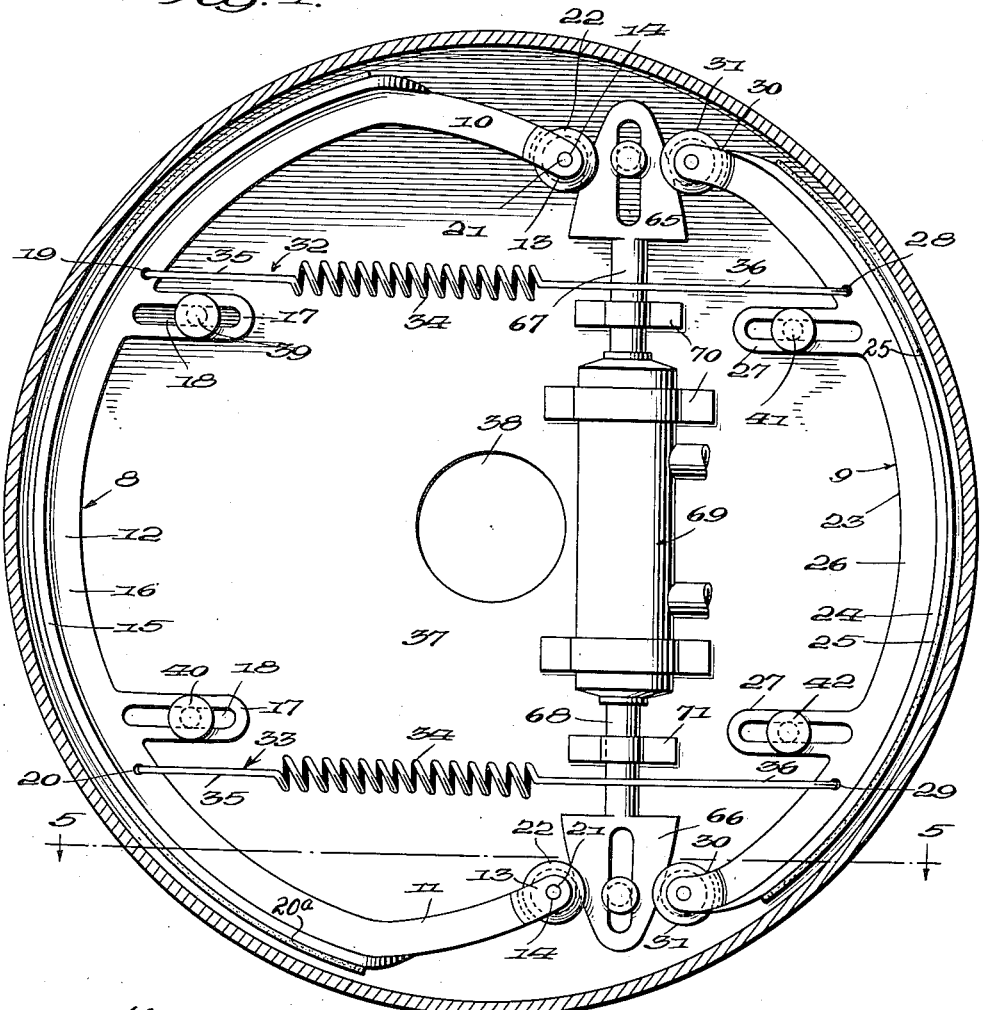
Figure 5:
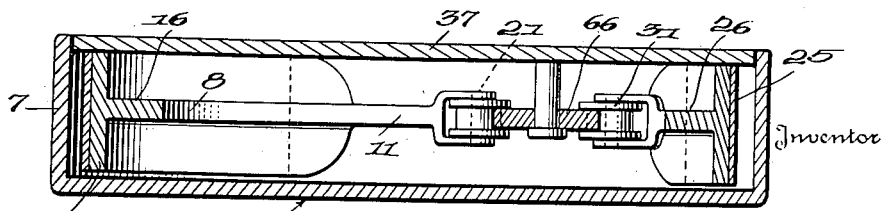

In the drawings:

Figure 1 is a vertical sectional view of a brake drum showing the adaptation therewith of a mechanically operated brake mechanism, in accordance with this invention, and with the parts of such mechanism illustrated in elevation, Figure 2 is a perspective view of one of the brake shoe expanders of the form shown in Figure 1, Figure 3 is a section on line 3—3, Figure 1, Figure 4 is a vertical sectional view of a brake drum showing the adaptation therewith of a hydraulically operated brake mechanism, in accordance with this invention and with the parts of such mechanism illustrated in elevation, and Figure 5 is a section on line 5—5, Figure 4.

With reference to Figures 1 and 3 to 5, a brake drum of known form is indicated at 6. The body of drum 6 is designated 7.

Both forms of the mechanism as shown include a pair of oppositely disposed brake shoes. The brake shoes employed in said mechanisms are of like construction and the reference characters which are applied to the brake shoes shown in Figure 4 correspond to the reference characters applied to the brake shoes shown in Figure 1. The brake shoes are generally indicated at 8, 9. The brake shoe 9 is of less length than the brake shoe 8. The brake shoe 8 is formed of a pair of end stretches 10, 11 and an intermediate stretch 12. The stretches 10, 11 are of materially less length than the stretch 12 and are inclined with respect to the stretch 12. The stretches 10, 11 incline inwardly and towards each other. The inner ends of the stretches 10, 11 are of forked contour as indicated at 13. The arms of each fork have aligning openings 14. The outer ends of the stretches 10, 11 merge into the ends of the stretch 12. The latter is of T-shaped cross section thereby providing a head 15 and a stem 16. The stem 16 merges into the inner face of the head 15 at the longitudinal median of the latter. The stretch 12 is of segmental contour. The stem 16 has extending inwardly therefrom a pair of parallel spaced arms 17 formed lengthwise thereof with elongated slots 18 which are of a length to extend into the stem 16. One of the arms 17 is disposed between the transverse median and one end of the stretch 12 and the other arm 17 is disposed between the transverse median and the other end of the stretch 12. The stem 16 is formed with a pair of openings 19, 20 arranged between the arms 17 and the ends of stretch 12. Secured to the outer face of head 15 and of a length to extend from a point in proximity to one end to a point in proximity to the other end of head 15 is a gripping means 20ª of any suitable material. The end stretches 10, 11 are continuations of the stem 16 of the stretch 12. Mounted in the aligned openings of the forks 14 are shafts 21 carrying grooved friction rollers 22.

The shoe 9 includes an intermediate stretch 23 of the same form as the stretch 12 of the shoe 8. Stretch 23, however, is of materially less length than that of stretch 12. The head 24 of stretch 23 has secured to its outer face a gripping means 25 corresponding to the gripping means 20ª. The stem 26 of the stretch 23 is provided with a pair of arms 27 which align with and are of the same construction as the arms 17. The arms 27 extend inwardly from the stem 26. Stem 26 of stretch 23 is formed with openings 28, 29 which align with the openings 19, 20 respectively. The shoe 9 includes a pair of end stretches 30 which are of forked contour and carry grooved friction rollers 31. The rollers 31 align with the rollers 22. The end stretches 20 are oppositely curved and the ends of the stretch 26 merge into the end stretches 30.

The stretch 12 of brake shoe 8 is connected to the stretch 23 of brake shoe 9 by a pair of spaced parallel resilient combined coupling and controlling elements 32, 33 of like form. Each of said elements includes a coiled spring 34 merging at one end into a straight rod 35 and at its other end into a straight rod 36. The rod 35 is of less length than the rod 36. The rods 35, 36 on the element 32 are anchored in the openings 19, 28 respectively. The rods 35 and 36 of the element 33 are anchored in the openings 20, 29 respectively. The manner of setting up the elements 32 and 33 relative to the brake shoes 8, 9, provide for resiliently coupling the brake shoes together.

An axially apertured carrier plate for the elements of each mechanism is indicated at 37 and the aperture in such plate is designated 38. The plate 37 is arranged in the open end of the drum 6. Fixed to the plate 37 are spaced headed studs 39, 40 which extend through the slots or openings 18 in the arms 17 and in connection with the arms 17 slidably connect brake shoe 8 with the carrier 37. Fixed to the latter are spaced headed studs 41, 42 which extend through the slots or openings in the arms 27 and in connection with the arms slidably connect brake shoe 9 to the carrier 37.

With reference to Figure 1 the brake mechanism includes a pair of oppositely disposed brake shoe expander elements 43, 44. The element 43 consists of a tapered expander head 45 formed centrally thereof with a lengthwise extending slot 46. The inner or largest end of the expander head 45 has formed integral therewith, centrally thereof a stem 47. The element 43 has the expander head 45 thereof arranged between a roller 22 and a roller 31 and travels in the grooves of such rollers. The element 44 consists of a tapered expander head 48 formed centrally thereof with a lengthwise extending slot 49. The inner or largest end of the expander head 48 has formed integral therewith, centrally thereof, a stem 50 of greater length than the stem 47 of element 43. The element 44 has the expander head 48 thereof arranged between the other roller 22 and the other roller 31 and travels in the grooves of such rollers. The stems 47, 50 slidably extend through guides 51, 52 respectively which are anchored to the carrier 37. Pivotally connected, as at 53, to the inner end of the stem 47 is a link 54. Pivotally connected, as at 55 to the inner end of the stem 50 is a link 56. The link 54 extends toward the guide 52. The link 56 extends toward the guide 51. The links 54, 56 are oppositely inclined with respect to each other and are inclined relative to stems 47, 50. The other end of link 54 is mounted against one end of an operating lever 57. The other end of the link 56 is mounted against the other end of the operating lever 57. Lever 57 centrally thereof is connected to a rock shaft 58 which extends through the carrier 37. Attached to the rock shaft 58 is a rock arm 59 therefor. The rock arm 59 is attached to the brake rod 60.

There is associated with the element 43 a release spring 61 which is connected at one end to the guide 51 and at its other end to the lever 57 and link 56. The said other end of the spring 61 constitutes a pivotal connection between link 56 and lever 57. There is associated with the element 44 a release spring 62 therefor. The spring 62 is connected at one end to the guide 52 and at its other end to the link 54 and lever 57. The said other end of the spring 62 constitutes a pivotal connection between the link 54 and lever 57. Anchored to the carrier 37 are headed guide pins 63, 64 for the elements 43, 44 respectively. The pin 63 extends through slot 46 of the head 45 of element 43 and in connection with the slot 46 slidably connects element 43 to carrier 37. The pin 64 extends through the slot 49 in the head 48 of element 44 and in connection with slot 49 slidably connects element 44 to the carrier 37. The elements 43, 44 are disposed in a plane removed from one side of the axis of the carrier 37.

The links 54, 56, lever 57, shaft 58 and arm 59 coact to provide a mechanical means for simultaneously shifting the elements 43, 44 to expand the brake shoes in opposite directions for the purpose of the brake shoes coacting with the inner face of the drum 6 to set up a braking action.

With reference to Figure 4, a hydraulic means is connected with the expander elements of the mechanism for the purpose of oppositely shifting said elements to simultaneously expand the brake shoes to set up a braking action. In Figure 4 one of the expander elements is indicated at 65 and the other at 66. The stems of the elements 65, 66 are designated at 67, 68 respectively and extend into a hydraulic mechanism 69. The latter is of known construction.

Guides 70, 71 are anchored to the carrier 37 for the stems 67, 68 respectively. The difference between the mechanism shown in Figure 4 and that shown in Figure 1 is the substituting of a hydraulic operating means of known form for a mechanical operating means.

What we claim is:

1. In a brake mechanism, a pair of oppositely shiftable brake shoes, each including a pair of end stretches and an intermediate stretch for braking, the intermediate stretch of one of said shoes being of materially greater length than the intermediate stretch of the other brake shoe, rollers carried by said end stretches, and oppositely shiftable expander elements travelling between and bearing on said rollers for expanding said shoes to apply a braking action.

2. In a brake mechanism, a pair of oppositely shiftable brake shoes, each including a pair of end stretches and an intermediate stretch for braking, the intermediate stretch of one of said shoes being of materially greater length than the intermediate stretch of the other brake shoe, rollers carried by said end stretches, oppositely shiftable expander elements travelling between and bearing on said rollers for expanding said shoes to apply a braking action, and coupling elements connecting said shoes together and each including a resilient portion intermediate its ends.

3. In a brake mechanism, a pair of oppositely shiftable brake shoes, each including a pair of end stretches and an intermediate stretch for braking, the intermediate stretch of one of said shoes being of materially greater length than the intermediate stretch of the other brake shoe, each of said intermediate stretches being formed with a plurality of inwardly extending slotted arms, and means coacting with said arms for slidably supporting said shoes.

4. In a brake mechanism, a pair of oppositely shiftable brake shoes, each including a pair of end stretches and an intermediate stretch for braking, the intermediate stretch of one of said shoes being of materially greater length than the intermediate stretch of the other brake shoe, each of said intermediate stretches being formed with a plurality of inwardly extending slotted arms, means coacting with said arms for slidably supporting said shoes, and coupling elements connecting said shoes together and each including a resilient portion intermediate its ends.

5. In a brake mechanism, a pair of oppositely shiftable brake shoes, each including an intermediate stretch of segmental contour merging into a pair of end stretches carrying rollers at their free ends, said intermediate stretches being for braking, inwardly extending slotted arms on the inner side of each intermediate stretch, means coacting with said arms for slidably supporting said shoes, coupling elements having their ends anchored in the inner side of said intermediate stretches for connecting said shoes together and each including a resilient portion intermediate its ends, and oppositely shiftable expander elements travelling between the rollers on said end stretches for expanding said shoes to apply a braking action.

ROBERT G. JONES.
ROMIE E. JOHNS.